UNITED STATES PATENT OFFICE.

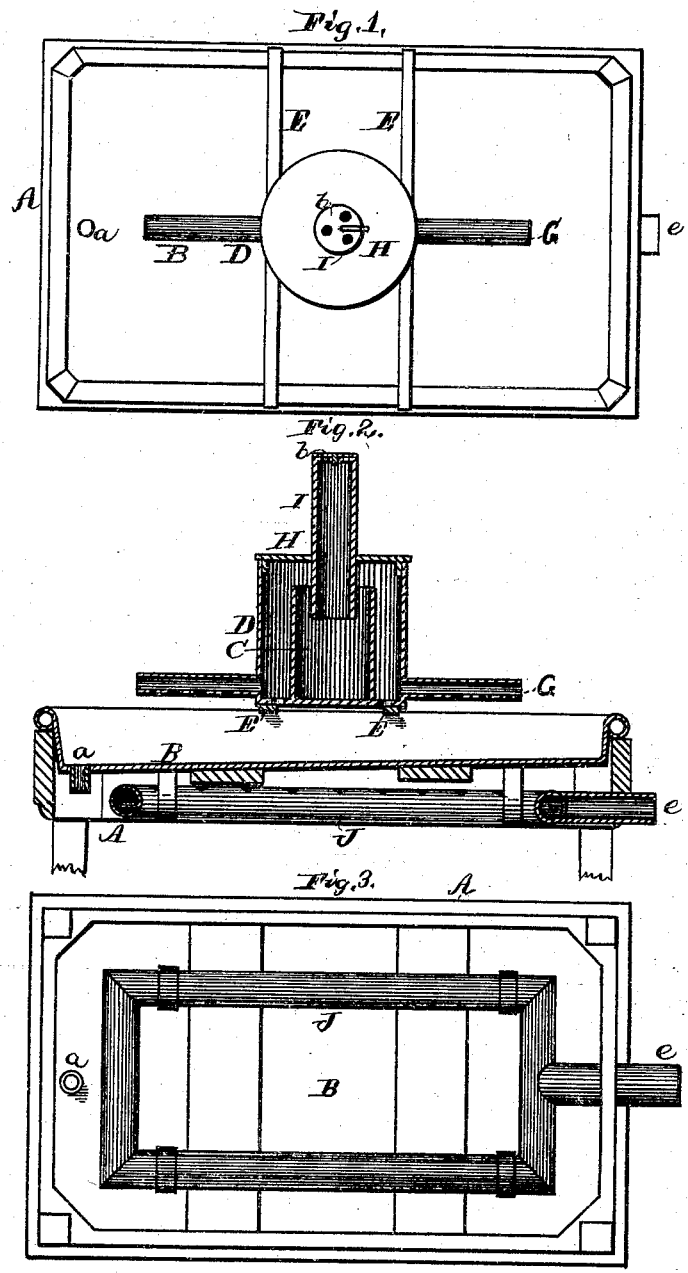

NELSON D. FERGUSON, OF CARTHAGE, NEW YORK.

IMPROVEMENT IN MILK-COOLERS.

Specification forming part of Letters Patent No. 171,219, dated December 21, 1875; application filed October 25, 1875.

*To all whom it may concern:*

Be it known that I, NELSON D. FERGUSON, of Carthage, county of Jefferson and State of New York, have invented certain new and useful Improvements in Milk Pan or Vat, of which the following is a specification:

The nature of my invention consists in the construction and arrangement of a milk pan or vat with ice-cooler.

In order to enable others skilled in the art to which my invention appertains to make and use the same, I will now proceed to describe its construction and operation, referring to the annexed drawing, which forms a part of this specification, and in which—

Figure 1 is a plan view of my milk-vat, with attachments. Fig. 2 is a longitudinal vertical section of the same. Fig. 3 is a bottom view of the vat.

A represents a frame of any suitable dimensions, in which the pan or vat B is placed. The bottom of the pan is an inclined plane, which causes all the milk to run out through the tube a at the lower end when the plug is drawn out. On top of the vat B is an ice-cooler, constructed of an interior cylinder, C, and an exterior cylinder, D, formed upon one bottom, and attached to cross-bars E E, which rest upon the edges of the pan, and have their ends bent over the same. The bottom between the two cylinders is perforated, and from each side of the cylinder D extends one or more tubes, G, over the pan, said tubes being also perforated on their under sides. The cylinder D is closed by a cover, H, having a central tube, I, extending upward, and at the upper end thereof is a valve or register, b, as shown. The inner cylinder C is to be filled with ice, and when the cover H is put on the valve or register b is opened, and the air passing down will become cooled by circulating around the ice, and passes downward out through the perforations in the bottom, and in the tubes G over the upper surface of the milk.

Cold air being heavy will fall down on the milk and bring the milk to a temperature of about 60°, and it holds the temperature very even by means of the slow melting of the ice, and by means of the valve or register b the supply of air can be easily regulated.

For warming the milk in winter-time I supply a pipe, J, under the bottom of the pan, said pipe being made in any desired tortuous form, and perforated on its upper side. Hot air is to be applied by means of a tinner's or other suitable furnace, and conveyed through a tin conductor to the open end e of the pipe J, the hot air then escaping through the perforations in said pipe under the bottom of the pan.

It will thus be seen that I apply cold air to the top of the pan, and hot air to the bottom, according to the temperature of the milk, which I have found by experiments is the best, and, in fact, only proper, method of tempering the same, and get the most cream from it.

Having thus fully described my invention, what I claim as new, and desire to secure by Letters Patent, is—

The combination, with a milk-pan, B, of an ice-cooler, consisting of the concentric cylinders C D, perforated bottom and tubes G, cover H, with tube I, and valve or register b, all substantially as and for the purposes herein set forth.

In testimony that I claim the foregoing as my invention, I hereunto affix my signature this 21st day of October, 1875.

NELSON D. FERGUSON.

Witnesses:
A. E. SAWYER,
CHESTER CARTER.